UNITED STATES PATENT OFFICE 2,149,498

COMPOSITION FOR APPLICATION TO ORGANIC DERIVATIVES OF CELLULOSE

Joseph E. Bludworth, Cumberland, Md., assignor to Celanese Corporation of America, a corporation of Delaware No Drawing. Application November 7, 1936, Serial No. 109,670

5 Claims. (Cl. 260—348)

This invention relates to compounds that are adapted for use in sizing and lubricating solutions or preparations for textile yarns, threads or fabric, and as plasticizers and swelling agents for organic derivative of cellulose yarns, filaments, fibers, films, powders, etc. While the compounds of this invention may be employed in sizing and lubricating solutions or preparations that are more particularly applicable to yarns or threads of silk, spun silk or artificial silk and especially yarns or threads of or containing artificial filaments or fibers of cellulose acetate or other fatty acid esters of cellulose, cellulose ethers and the like, they may also be applied to any textile yarns or threads to be used as the warp or weft or wherever sized yarns or threads are required. The compounds of this invention are particularly suitable as plasticizers and swelling agents for cellulose acetate.

An object of the invention is the economic and expeditious production of polymers of the cyclic ethers which polymers are not only plasticizers or swelling agents for organic derivatives of cellulose but they may be employed in sizing and lubricating compositions for yarns, filaments, fibers, etc., especially when the same contain organic derivatives of cellulose. Other objects of the invention will appear from the following detailed description.

An advantage of employing certain of the polymers of the cyclic ethers, especially the polymers of ethylene oxide, made in accordance with this invention, in yarn sizes and lubricants is that the resulting compositions are hygroscopic and easily removed by scouring, or by treating the textile material or article with warm or cold water. A further advantage of employing certain of the polymers of the cyclic ethers made in accordance with this invention in yarn sizes and lubricants is that they are soluble in both water and benzene.

An advantage of employing the polymers of the cyclic ethers made in accordance with this invention in films or sheets of organic derivatives of cellulose is that flexible films or sheets of a high degree of clarity may be made. Films containing the higher boiling polymers have been found to be quite resistant to creasing and exceptionally tough.

In accordance with my invention I polymerize the cyclic ethers by contacting them, at suitable temperatures, with fuller's earth or other similar material containing aluminum oxide. The product of polymerization of the cyclic ethers by this method consists of a mixture of polymers ranging in physical properties from a syrupy liquid through waxy solids to rubbery compounds.

This invention is applicable to the polymerization of cyclic ethers such as ethylene oxide, propylene oxide, tetramethylene oxide, isobutylene oxide, and their homologues and isomers. The cyclic ethers may be derived from any suitable source. For instance, they may be obtained as a by-product in the production of acetone and methyl alcohol by a partial oxidation of petroleum oils and gases.

It is known that if the cyclic ethers as a vapor are contacted with aluminum oxide earth they are formed into the corresponding aldehydes. In accordance with this invention, however, the temperature of the cyclic ethers during their contact with the aluminum oxide earth is such that the cyclic ethers remain in a liquid state, thereby forming the higher boiling polymers instead of the aldehydes. The time of contact of the cyclic ethers with the aluminum oxide earth will depend upon the temperature employed. For instance, when contacting ethylene oxide with fuller's earth at a temperature around 0° C. for a period of time which may be from 2 to 7 days a very good yield of higher boiling polymers is obtained. The polymers may be separated from the aluminum oxide earth by washing the same with solvents for the polymers, by the distillation of the volatile polymers from the aluminum oxide earth or a combination of distilling and extracting the polymers from the earth.

The major portion of the polymers formed from ethylene oxide in accordance with this invention are soluble in water and benzene but are not soluble in ether. While ethylene oxide has a boiling point of 11° C., the polymers of the same boil at about 80° C. or higher. The molecular weight of the ethylene oxide polymers varies from 4600 to as low as 400. The major fraction of the polymers made from isobutylene oxide in accordance with this invention are insoluble in water but are soluble in ether. While isobutylene oxide has a boiling point of about 51° C., the polymers formed from the same in accordance with this invention boil at about 135° C. or higher. Propylene oxide boils at 35° C. while the polymers formed from same boil at 125° C. or higher. All fractions of the polymers are soluble in methyl alcohol, acetone and pentane. The polymers of tetramethylene oxide, which has a boiling point of 67° C., when made in accordance with this invention, boil at about 232° C. or higher, and they are substantially free of the waxy fraction found in the polymers of the other ethers and are slightly dark in color.

As stated above, the product formed by contacting the cyclic ethers with an aluminum oxide earth is apparently a mixture of polymers of different properties. These polymers may be separated into individual polymers or groups of polymers having related characteristics. For instance, the product of the polymers may be separated into fractions by distillation, fractional extraction or by fractional precipitation. The lighter or more liquid fractions may be used as a yarn or fiber lubricant, while the heavier or more viscous fractions may be used as a yarn or thread size. Either of the separated fractions or the mixture of polymers as formed may be incorporated in organic derivatives of cellulose as a plasticizer and swelling agent in the production of sheets, tubes, films, press mass powder, lacquers, fabric coating compositions and articles.

The lighter or more liquid fractions of the polymers, hereinafter called the liquid polymers, may be used as such as a lubricant for yarns or threads formed of organic derivatives of cellulose. The liquid polymers may be used metier, that is, they may be applied to the yarn immediately after the formation thereof by extruding a solution of the organic derivatives of cellulose into a solidifying medium by applying the liquid polymers by any suitable means to the yarn between the metier and a point where the yarn is wound upon a spool or bobbin. Yarns may be lubricated with the liquid polymers at any suitable point in the textile operations, for instance, as the yarn is being wound from one package to another in a rewinding, twisting or doubling operation, or hanks, spools or bobbins containing the yarn may be dipped into the polymers. If desired, the liquid polymers may be mixed with other lubricant such as mineral oils, vegetable oils, animal fats or oils or the sulphonated products of these. The liquid polymers or a mixture of the liquid polymers with other lubricants may also be applied as solutions or emulsions in suitable solvents or thinners for the same.

The heavier or more viscous fractions of the polymers, hereinafter called the viscous polymers, may be used as a size in slasher operations for warps or as a tacking medium in the doubling of yarns where little or no twist is desired and other places where sized yarns are desired. The viscous polymers may be used alone or they may be mixed with starch, gelatin, oils or mixtures of these to form suitable sizes for the textile operation to which the yarn is to be subjected.

For the purpose of describing this invention but without being limited thereto the following example is given.

*Example*

To 50 parts by weight of fuller's earth, activated by heating to from 371° C. to 482° C., is added 100 parts by weight of liquid ethylene oxide. The mixture is then sealed in a suitable container and kept cooled to about 0° C. for from two to seven days. After evaporation of unconverted ethylene oxide and formed aldehydes the fuller's earth is washed with water or benzene to recover the polymers. 63 parts of polymers freed of water or benzene used to extract them from the fuller's earth are dissolved in 500 parts of benzene to which is added 500 parts of ether. The precipitate (10 parts) is filtered off and dried. It consists of a soft white rubbery solid with a greasy feel. To the filtrate from above is added 2000 parts more of ether and a further precipitate is obtained. The precipitate (3 parts) is a waxy solid. The filtrate from the last step is evaporated down to 100 parts and 400 parts of ether added. The mixture separates into two liquid phases. One phase (20 parts), insoluble in ether, consists of a syrupy liquid that approaches a soft pasty solid. The other phase (30 parts) consists of a syrupy liquid about as viscous as diethylene glycol. Any of these fractions or mixtures of same may be employed as lubricants, sizes, plasticizers, etc. as more fully stated above.

It is to be understood that the foregoing detailed description is given merely by way of illustration and many variations may be made therein without departing from the spirit of my invention.

Having described my invention, what I desire to secure by Letters Patent is:

1. Process for the production of cyclic ether polymerization products comprising contacting a cyclic ether in liquid state with fuller's earth, which has been activated by heating for 2 to 7 days until polymers of the ether are formed.

2. Process for the production of cyclic ether polymerization products comprising contacting a cyclic ether in liquid state with fuller's earth, which has been activated by heating to from 371° C. to 482° C., for 2 to 7 days at 0° C. until polymers of the ether are formed.

3. Process for the production of ethylene oxide polymerization products comprising contacting ethylene oxide in liquid condition with fuller's earth, which has been activated by heating, for 2 to 7 days until polymers of the ethylene oxide are formed.

4. Process for the production of ethylene oxide polymerization products comprising contacting ethylene oxide in liquid condition with fuller's earth, which has been activated by heating to from 371° C. to 482° C., for 2 to 7 days at 0° C. until polymers of the ethylene oxide are formed.

5. Ethylene oxide polymerization products having a boiling point above about 80° C. and having a molecular weight between 400 and 4600 and produced by contacting ethylene oxide in liquid state with fuller's earth, which has been activated by heating, for 2 to 7 days.

JOSEPH E. BLUDWORTH.